United States Patent
Benson

(10) Patent No.: US 11,668,261 B2
(45) Date of Patent: Jun. 6, 2023

(54) PUMP ACTIVE INLET VALVE SPILLING RESIDUAL PRESSURE

(71) Applicant: Cummins Inc., Columbus, IN (US)

(72) Inventor: Donald J. Benson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 34 days.

(21) Appl. No.: 17/605,174

(22) PCT Filed: Apr. 22, 2019

(86) PCT No.: PCT/US2019/028480
§ 371 (c)(1),
(2) Date: Oct. 20, 2021

(87) PCT Pub. No.: WO2020/219007
PCT Pub. Date: Oct. 29, 2020

(65) Prior Publication Data
US 2022/0186675 A1 Jun. 16, 2022

(51) Int. Cl.
*F02D 41/38* (2006.01)

(52) U.S. Cl.
CPC .. *F02D 41/3845* (2013.01); *F02D 2200/0602* (2013.01); *F02D 2200/101* (2013.01)

(58) Field of Classification Search
CPC ....... F02D 2200/0602; F02D 2200/101; F02D 41/3845; F02D 41/406
See application file for complete search history.

(56) References Cited

U.S. PATENT DOCUMENTS

| 4,552,117 | A | 11/1985 | Djordjevic |
| 6,234,123 | B1 * | 5/2001 | Iiyama ................ F02D 41/3035 123/90.15 |
| 6,568,911 | B1 * | 5/2003 | Brightwell ............ F04B 35/008 417/53 |

(Continued)

FOREIGN PATENT DOCUMENTS

| DE | 19800760 | 8/1998 |
| EP | 1669579 | 6/2006 |
| WO | 0242626 | 5/2002 |

OTHER PUBLICATIONS

International Search Report and Written Opinion issued by the ISA/US, dated Jul. 16, 2019, for International Application No. PCT/US2019/028480; 7 pages.

(Continued)

*Primary Examiner* — Carl C Staubach
(74) *Attorney, Agent, or Firm* — Taft, Stettinius & Hollister LLP

(57) ABSTRACT

A method and system is provided of controlling a pump having a pumping element comprising: determining, by a controller, a suspension of one or more fuel delivery events for a pumping element of the at least one pumping element; subsequent to determining the suspension of the one or more fuel delivery events, providing, by the controller, a first command to open an inlet valve of the pumping element to remove a portion of residual fluid within a pumping chamber based on pressure within the pumping chamber of the pumping element; and subsequent to providing the first command, providing, by the controller, a second command to close the inlet valve of the pumping element based on a top dead center (TDC) position of the pumping element.

20 Claims, 14 Drawing Sheets

(56) References Cited

U.S. PATENT DOCUMENTS

| | | |
|---|---|---|
| 7,179,060 B2 | 2/2007 | Sommers et al. |
| 7,546,831 B2 | 6/2009 | Kaneko |
| 7,635,257 B2 | 12/2009 | Inoue |
| 7,975,674 B2 | 7/2011 | Kylstrom et al. |
| 8,015,964 B2 | 9/2011 | Eddy |
| 9,556,836 B2 | 1/2017 | Morel et al. |
| 9,874,185 B2 | 1/2018 | Pursifull et al. |
| 9,926,878 B2 | 3/2018 | Suzuki |
| 9,957,935 B2 | 5/2018 | Pursifull |
| 2008/0078362 A1 | 4/2008 | Tian |
| 2009/0150046 A1* | 6/2009 | Achleitner .......... F02D 41/3863 123/447 |
| 2010/0074783 A1* | 3/2010 | Inoue ................... F04B 1/0408 417/505 |
| 2013/0022484 A1 | 1/2013 | Fuchs et al. |
| 2014/0224209 A1* | 8/2014 | Pursifull ............. F02D 41/3845 123/294 |
| 2015/0192115 A1 | 7/2015 | Seith |
| 2016/0356237 A1* | 12/2016 | Pursifull ................ F02D 41/20 |
| 2017/0248096 A1* | 8/2017 | Zeng ................. F02D 41/3872 |
| 2017/0356435 A1* | 12/2017 | Gray .................... F04B 43/067 |
| 2020/0074783 A1 | 3/2020 | Claghorn et al. |
| 2022/0120233 A1* | 4/2022 | Phillips ............... F02D 41/3845 |
| 2022/0252018 A1* | 8/2022 | Peavler ................... F02D 41/22 |

OTHER PUBLICATIONS

European Search Report, EP Appln. No. 19926330.2, 10 pgs., dated Dec. 7, 2022.

* cited by examiner

PUMP ACTIVE INLET VALVE SPILLING RESIDUAL PRESSURE

CROSS-REFERENCE TO RELATED APPLICATIONS

The present application is a national stage application of International (PCT) Patent Application Serial No. PCT/US2019/028480, filed on Apr. 22, 2019, the complete disclosure of which is expressly incorporated by reference herein.

TECHNICAL FIELD

The present invention relates generally to fuel pumps and more particularly to fuel pump operational control methodologies.

BACKGROUND

Fueling systems, and in particular fueling systems using a common rail accumulator, are typically controlled to maintain the fuel available to the fuel injectors within a desired pressure range. To this end, conventional control methodologies for fuel pumps receive feedback representing the rail pressure and cause the pumping element(s) of the fuel pump to deliver a range of delivery quantities (e.g., from zero to full capacity delivery) of fuel to the accumulator during every pumping cycle. Further, after each pumping cycle, a small amount of residual fuel remains within the fuel pump's pumping chamber. When the fuel pump is constantly delivering fuel to the accumulator and at a near constant operating condition, this residual fuel within the fuel pump's pumping chamber remains substantially constant and is mainly determined by component geometries and the operating pressure. This residual fuel creates inefficiencies as it is repeatedly compressed and decompressed in association with each potential pumping event.

Occasionally, the fuel pump does not need to deliver fuel in one or more subsequent pumping cycles. In such instances, the residual fuel remains trapped within the fuel pump while the camshaft of the fueling pump continues to rotate. Due to this rotation, the residual fuel leaks out of the fuel pump causing energy losses associated with repeated compression and decompression of the fuel as well as loss of fuel from the pumping chamber as a result of fuel leakage. Furthermore, the compression and decompression of the excess residual fuel may also cause audible noise. Accordingly, it is desirable to provide control methodologies for fueling systems that address these and other shortcomings of conventional approaches.

SUMMARY

According to one embodiment, the present disclosure provides a method of controlling a pump having at least one pumping element comprising: determining, by a controller, a suspension of one or more fuel delivery events for a pumping element of the at least one pumping element; subsequent to determining the suspension of the one or more fuel delivery events, providing, by the controller, a first command to open an inlet valve of the pumping element to remove a portion of residual fluid within a pumping chamber based on pressure within the pumping chamber of the pumping element; and subsequent to providing the first command, providing, by the controller, a second command to close the inlet valve of the pumping element based on a top dead center (TDC) position of the pumping element.

In some examples, the method further comprises determining a first instance in time corresponding to the pressure within the pumping chamber. The providing the first command is based on the first instance in time. In some instances, the method further comprises determining a response time based on at least one of: the inlet valve's opening response time, a stroke of the inlet valve, a speed of the pumping element, an engine speed, a profile of a camshaft, a pressure of a high-pressure system, and an amount of residual fluid within the pumping chamber. The determining the first instance in time is based on the response time. In some variations, the method further comprises determining a pre-determined opening time corresponding to a time period prior to an increase in pressure within the pumping chamber. The determining the first instance in time is based on the pre-determined opening time.

In some instances, the method further comprises determining a second instance in time corresponding to the TDC position of the pumping element. The providing the second command is based on the second instance in time. In some examples, the method further comprises determining a response time based on at least one of: the inlet valve's closing response time, a stroke of the inlet valve, a speed of the pumping element, an engine speed, a profile of a camshaft, a pressure of a high-pressure system, and an amount of residual fluid within the pumping chamber. The determining the second instance in time is based on the response time. In some variations, the method further comprises determining a pre-determined closing time corresponding to a time period prior to the pumping element reaching the TDC position. The determining the second instance in time is based on the pre-determined closing time. In some instances, the method further comprises determining a pre-determined closing time corresponding to a time period subsequent to the pumping element reaching the TDC position. The determining the second instance in time is based on the pre-determined closing time. In some examples, the determining the suspension of one or more fuel delivery events is based on a pressure measurement indicating a pressure within a fuel accumulator.

Another embodiment of the present disclosure provides a method of controlling a pump having at least one pumping element comprising: determining, by a controller, a suspension of one or more fuel delivery events for a pumping element of the at least one pumping element; and subsequent to determining the suspension of the one or more fuel delivery events, providing, by the controller, one or more commands to control an opening of an inlet valve of the pumping element to remove a portion of residual fluid within a pumping chamber of the pumping element, wherein the one or more commands indicates an instance in time to open the inlet valve and a duration to keep the inlet valve open.

In some instances, the method further comprises determining the instance in time based on an increase in pressure within the pumping chamber. In some examples, the method further comprises determining a response time based on at least one of: the inlet valve's opening response time, a stroke of the inlet valve, a speed of the pumping element, an engine speed, a profile of a camshaft, a pressure of a high-pressure system, and an amount of residual fluid within the pumping chamber. The determining the instance in time is based on the response time. In some variations, the method further comprises determining a pre-determined opening time corresponding to a time period prior to the increase in pressure within the pumping chamber. The determining the instance in time is based on the pre-determined opening time.

In some instances, the method further comprises determining the duration to keep the inlet valve open is based on a top dead center (TDC) position of the pumping element. In some examples, the method further comprises determining a response time based on at least one of: the inlet valve's closing response time, a stroke of the inlet valve, a speed of the pumping element, an engine speed, a profile of a camshaft, a pressure of a high-pressure system, and an amount of residual fluid within the pumping chamber. The determining the duration to keep the inlet valve open is based on the response time. In some variations, the method further comprises determining a pre-determined closing time corresponding to a time period prior to the pumping element reaching the TDC position. The determining the duration to keep the inlet valve open is based on the pre-determined closing time. In some instances, the method further comprises determining a pre-determined closing time corresponding to a time period subsequent to the pumping element reaching the TDC position. The determining the duration to keep the inlet valve open is based on the pre-determined closing time. In some examples, the determining the suspension of one or more fuel delivery events is based on a pressure measurement indicating a pressure within a fuel accumulator.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
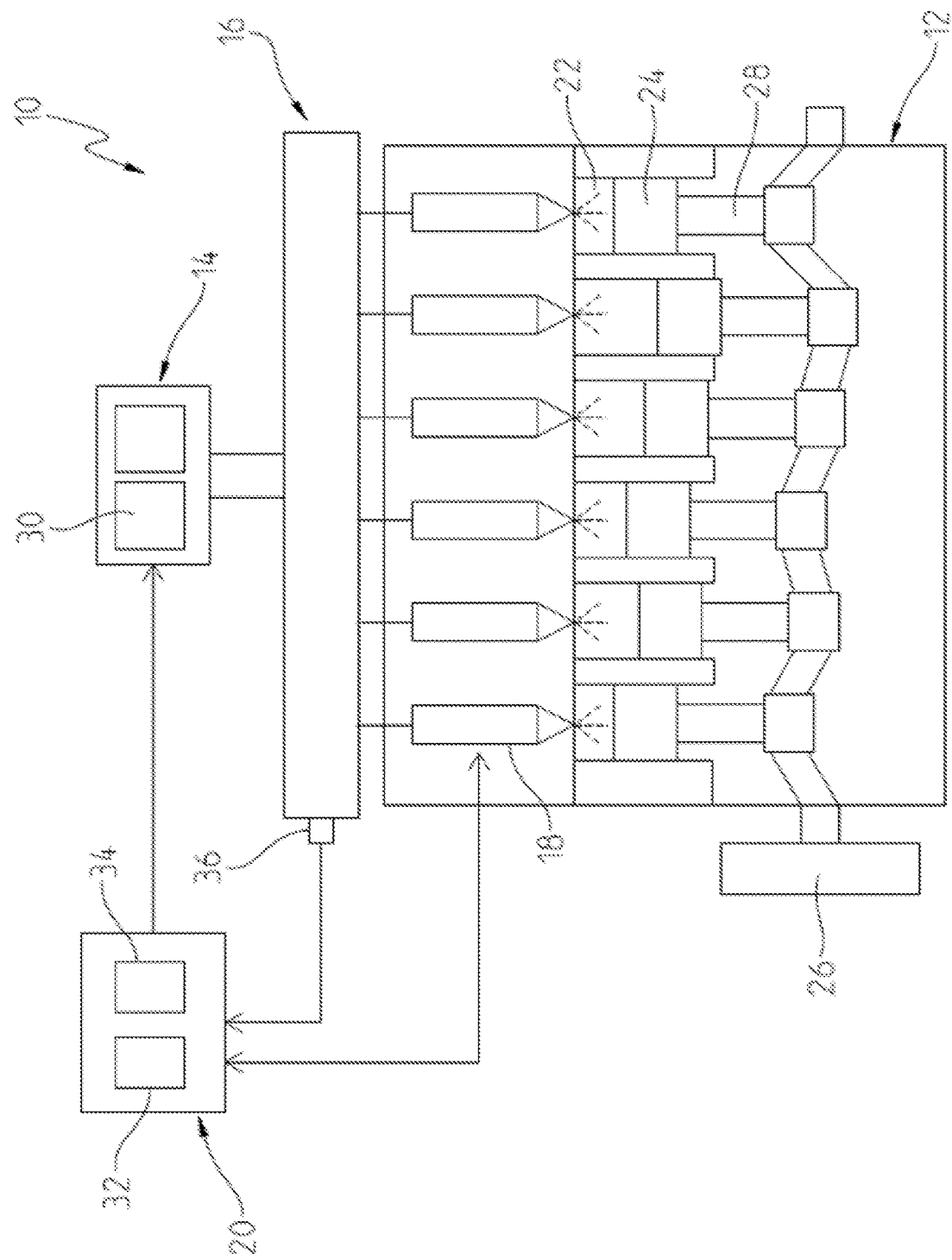
FIG. 1 shows a conceptual drawing of a fueling system and an engine.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION

One of ordinary skill in the art will realize that the embodiments provided can be implemented in hardware, software, firmware, and/or a combination thereof. For example, the controllers disclosed herein may form a portion of a processing subsystem including one or more computing devices having memory, processing, and communication hardware. The controllers may be a single device or a distributed device, and the functions of the controllers may be performed by hardware and/or as computer instructions on a non-transient computer readable storage medium. For example, the computer instructions or programming code in the controller (e.g., an electronic control module ("ECM")) may be implemented in any viable programming language such as C, C++, HTML, XTML, JAVA or any other viable high-level programming language, or a combination of a high-level programming language and a lower level programming language.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Referring now to FIG. 1, portions of a fueling system 10 and an engine 12 are shown. Fueling system 10 generally includes a fuel pump 14, a common rail fuel accumulator 16, a plurality of fuel injectors 18 and a controller 20. Engine 12 generally includes a plurality of cylinders 22 in which a plurality of pistons 24 reciprocate under power provided by fuel combustion, thereby causing a crankshaft 26 to rotate via a corresponding plurality of connecting rods 28. Fuel pump 14, which is depicted in this example as having two pumping elements 30 (further described below), receives fuel from a fuel source (e.g., tank 102 shown in FIG. 3), pressurizes the fuel, and provides the pressurized fuel to accumulator 16. Fuel injectors 18, which are coupled to and receive fuel from accumulator 16 under control of controller 20, deliver fuel (also under control of controller 20) to cylinders 22 at specified times during the engine cycle as is well known in the art.

The highly simplified controller 20 shown in FIG. 1 includes a processor 32 and a memory 34. Of course, controller 20 may be substantially more complex and may include multiple processors and memory devices as well as a plurality of other electronic components. In this example, controller 20 receives pressure measurements from a pressure sensor 36 coupled to accumulator 16. The pressure measurements indicate the pressure of fuel in accumulator 16. Controller 20 controls operation of pump 14 in response to the pressure measurements and/or other measurements that will be described below. More specifically, controller 20 controls the delivered pumping output for each pumping element 30. In other words, the controller 20 controls one or more valves (e.g., an inlet valve 44 shown in FIGS. 2-4) that provide fuel from the fuel source or tank 102 to the pumping element 30.

Figure 2:
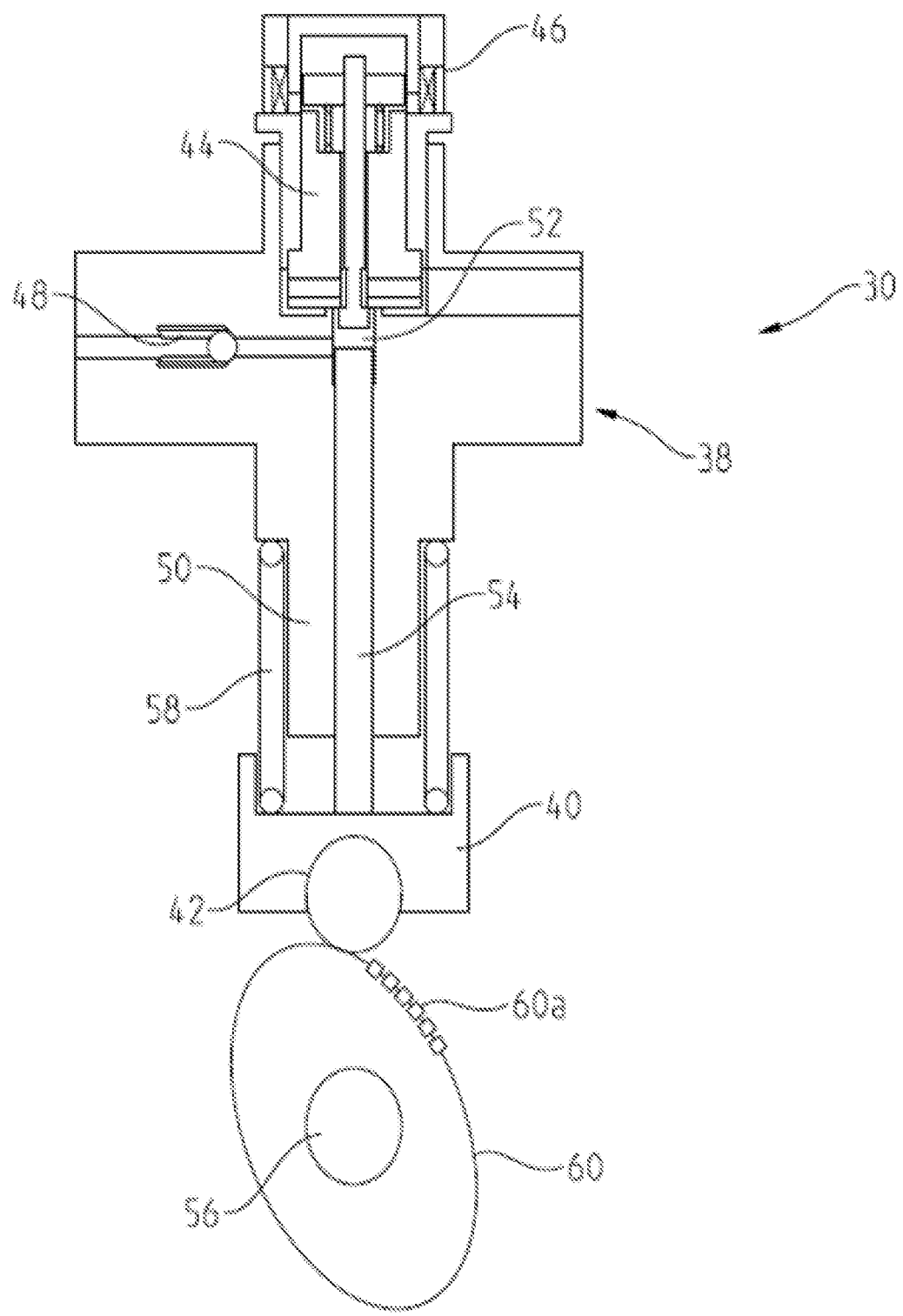
FIG. 2 shows a cross-sectional side view of a pumping element of the fueling system of FIG. 1.

FIG. 2 depicts one example of a pumping element 30 of FIG. 1 in greater detail. As shown, the pumping element 30 generally includes a housing 38, a tappet 40 and a roller 42. An inlet valve 44 controlled by a solenoid 46 is disposed at an upper end of housing 38. An outlet valve 48 is also disposed in housing 38. Housing 38 includes a barrel 50 which defines a pumping chamber 52. A plunger 54 coupled to tappet 40 reciprocates in pumping chamber 52, compressing any fuel in pumping chamber 52 during upward pumping strokes for delivery to outlet valve 48, and from there, to accumulator 16. Fuel is delivered to pumping chamber 52 by inlet valve 44 during downward filling strokes.

Reciprocal motion of plunger 54 is powered by rotational motion of camshaft 56 (which is coupled to crankshaft 26 of FIG. 1 in some examples) and a downward biasing force of return spring 58. As camshaft 56 rotates, an eccentric lobe 60 mounted to camshaft 56 also rotates. Roller 42 remains in contact with lobe 60 as a result of the biasing force of spring 58. Accordingly, during half of a revolution of camshaft 56, lobe 60 pushes roller 42 (and tappet 40 and plunger 54) upwardly, and during the other half spring 58 pushes roller 42 (and tappet 40 and plunger 54) downwardly into contact with lobe 60. The operation of inlet valve 44 and outlet valve 48 is controlled by controller 20 to cause the pumping element 30 to deliver quantities of fuel to accumulator 16 according to the various control methodologies known in the art.

Figure 3:
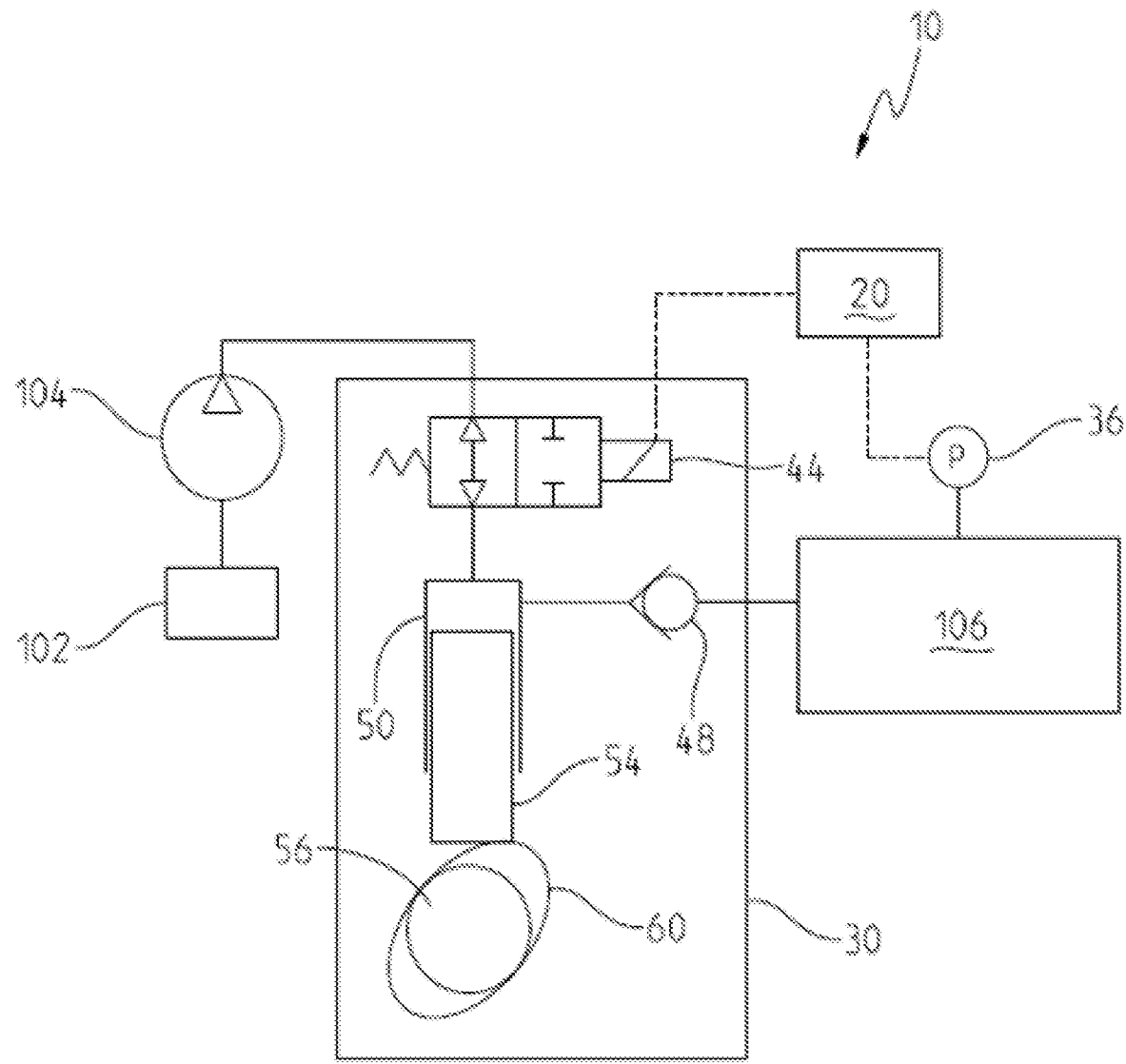
FIG. 3 shows an exemplary block diagram of the fueling system with a pumping element.
Figure 4:
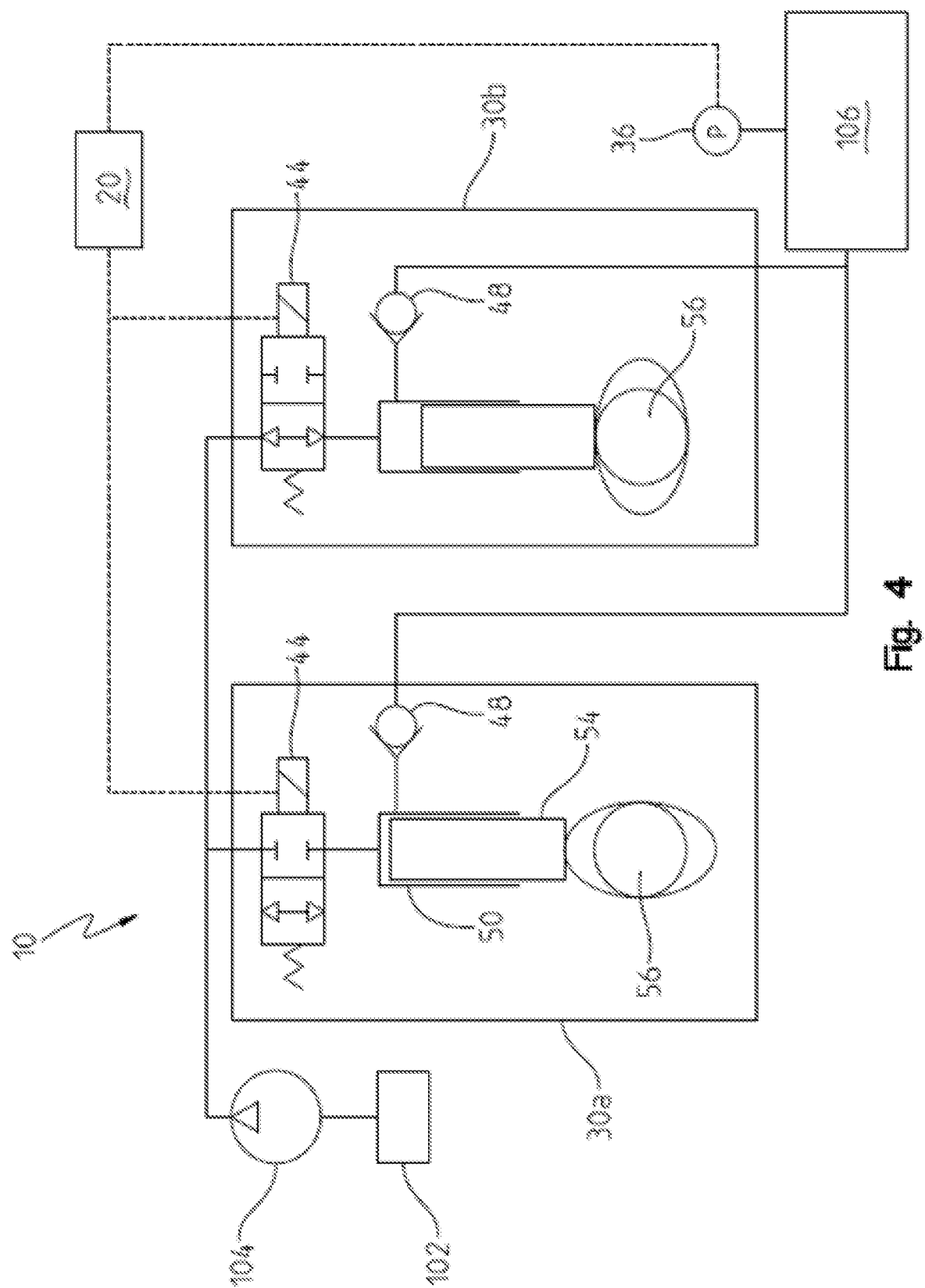
FIG. 4 shows another exemplary block diagram of the fueling system with a pumping element

FIGS. 3 and 4 depict exemplary block diagrams of the fueling system 10 with one or more pumping elements 30. For example, FIG. 3 shows a simplified version of the fueling system 10 with a single pumping element 30. FIG. 4 shows a simplified version of the fueling system 10 with two pumping elements 30a and 30b. Of course, additional elements, sensors, components, subsystems, and/or other entities, including additional pumping elements 30, may also be used by and/or included within the fueling system 10 and used by the methodologies described below.

As shown in FIGS. 3 and 4, a low-pressure pump 104 delivers or pumps fluid (e.g., fuel) from a fueling source (e.g., tank) 102 to the inlet valve 44. The controller 20 controls (e.g., actuates, opens, closes, and/or otherwise operates) the inlet valve 44 to permit the delivery of fuel to the pumping chamber 52 (shown in FIG. 2). The upward and downward movement of the plunger 54 described above causes the fluid to flow through the outlet valve 48 to a high-pressure system 106 (e.g., the accumulator 16 and/or the fuel injectors 18 shown in FIG. 1). The pumping chamber outlet check valve 48 is typically located on the discharge side of the high pressure pumping chamber 52.

Figure 5:
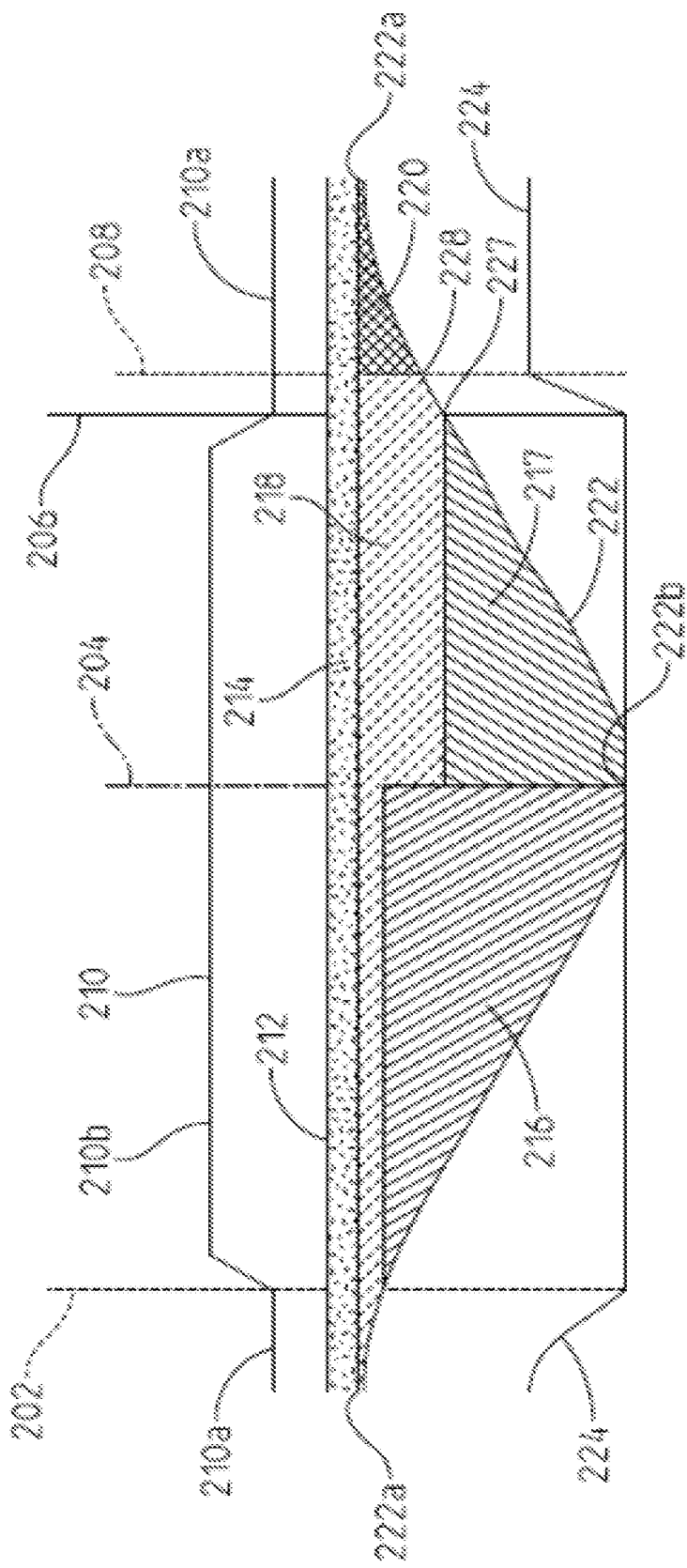
FIG. 5 shows a prior art methodology and the results of the methodology for operating a pumping element and the results of the pumping element.

The control methodologies of the fuel pump 14 described in FIGS. 5-13 below, including exemplary novel methodologies for removing residual fluid from the pumping chamber 52 of the fuel pump 14 after a pumping cycle, will be described below with reference to FIGS. 1-4 above. For example, FIG. 5 depicts a common and prior art control methodology for controlling the delivery of a quantity of fuel from one pumping element 30 to the high-pressure system 106. For example, for each pumping cycle of the fuel pump 14, the controller 20 controls a control valve (e.g., inlet valve 44) that is located between the low-pressure supply line (e.g., the low-pressure pump 104 and the tank 102) and the pumping chamber 52. In some instances, the inlet control valve 44 is a normally open valve (e.g., always open, but in response to receiving instructions from the controller 20, the inlet valve 44 closes). In other instances, the inlet control valve 44 is a normally closed valve (e.g., always closed, but in response to receiving instructions from the controller 20, the inlet valve 44 opens).

Referring to the top portion of FIG. 5, a typical pump delivery event begins by opening the inlet control valve 44 to enable fluid from the low-pressure supply line to enter the pumping chamber 52. For example, the controller 20 provides one or more instructions to open the inlet valve 44. In response to the instructions, at time 202, the inlet valve 44 is configured to open. For instance, the position 210 of the inlet valve 44 is configured to transition from a closed position 210a to an open position 210b. At a later time 206, the inlet valve 44 is configured to close (e.g., transition from the open position 210b back to the closed position 210a). In some examples, the inlet valve 44 includes a spring (e.g., spring 58) and/or another actuator that that is configured to open the inlet valve 44 based on the received commands from the controller 20 and further close the inlet valve 44 based on the received commands.

Referring to the bottom portion of FIG. 5, the camshaft 56 rotates the lobe 60, which in turn axially translates the plunger 54. Based on the rotation of the camshaft 56/lobe 60, the position 222 of the plunger 54 is axially displaced from a bottom dead center (BDC) position 222b to a top dead center (TDC) position 222a. Referring back to FIG. 4, the pumping element 30a depicts a camshaft 56 that axially displaces the plunger 54 into the TDC position 222a. The pumping element 30b depicts a camshaft 56 that axially displaces the plunger 54 into the BDC position 222b.

Returning to FIG. 5, as the camshaft 56 rotates the plunger 54 from BDC 222b to the left of (e.g., before) TDC 222a and since the inlet valve 44 is open for this case until it is fully closed at time 208, the fuel in the pumping chamber 52 is spilled through the open inlet valve 44 back into the inlet supply circuit 102 and/or 104 until time 208. After the inlet valve 44 is closed at time 208 and as the plunger moves towards TDC 222a, the pressure 224 increases (e.g. after time 208). In other words, the pumping chamber 52 pressure rise associated with fuel compression begins after 208. When the pumping chamber pressure 224 rises to a threshold level (e.g., at which the net force acting on the outlet check valve 48 causes the outlet valve 48 to open), the pumping element 30 begins delivery of fluid to the downstream circuit (e.g., the high-pressure system 106). The pump delivery continues until near TDC 222a when the outlet valve 48 closes. As the camshaft 56 rotates after TDC 222a, the pumping chamber 52 volume increases and the pressure 224 in the pumping chamber decreases from its delivery pressure level.

The fluid level within the pumping chamber 52 continually changes during the entire pumping cycle. Line 212 indicates the zero fluid line and the shaded portions (214-220) below line 212 indicate the fluid level in the pumping chamber 52. For example, the fluid level is at its maximum value when the plunger 54 is at BDC 222b. Moving from TDC 222a to 222b represents an increase in the volume, which may or might not be the fluid.

The movement of the plunger 54 between TDC 222a and BDC 222b causes the fluid to fill 216, spill 217, compress 218, and eventually be delivered 220 to the high-pressure system 106. Shaded portions 214-220 indicate the amount of fluid (e.g., volume and/or mass) within the pumping chamber 52 at different stages during a pumping cycle. For example, portion 216 shows an amount of fluid filling the pumping chamber 52 caused by opening the inlet valve 44 and the plunger 54 moving from TDC 222a to BDC 222b. Portion 217 shows an amount of fluid spilling from the pumping chamber 52 back through the low-pressure line caused by the inlet valve 44 remaining open and the plunger 54 moving from BDC 222b to TDC 222a.

Portion 218 shows the volume of the fluid as it compresses and decompresses. Starting at the left TDC 222a position in FIG. 5, as the camshaft 56 retracts from TDC 222a, the pressurized fluid that is contained in the trapped volume 214 at TDC 222a expands as it is decompressed. The fluid volume represented by 218 increases until the time 202 after which the pumping chamber is depressurized. The level of decompressed volume is represented by the section of 218 to the left of 222b. The compression begins at time 206 when the inlet valve 44 is fully closed. The fluid level at this time 206 is shown as 227. In other words, the fluid volume shown in 218 to the right of 222b is compressed after time 206. The pressure in the pumping chamber 52 achieves the level to open the outlet check valve at time 208 and at time 208, the fluid level is shown as 228. After time 208, the pump begins to deliver the volume represented by 220. Portion 220 indicates an amount of fluid being delivered to the high pressure system 106 caused by the closing of the inlet valve 44 and/or the pressure 224 rising in the pumping chamber 52. Portion 214 indicates an amount or volume of fluid trapped within the pumping chamber 52 (e.g., the resulting fluid volume within the pumping chamber 52 after a pumping event/cycle).

Figure 6:
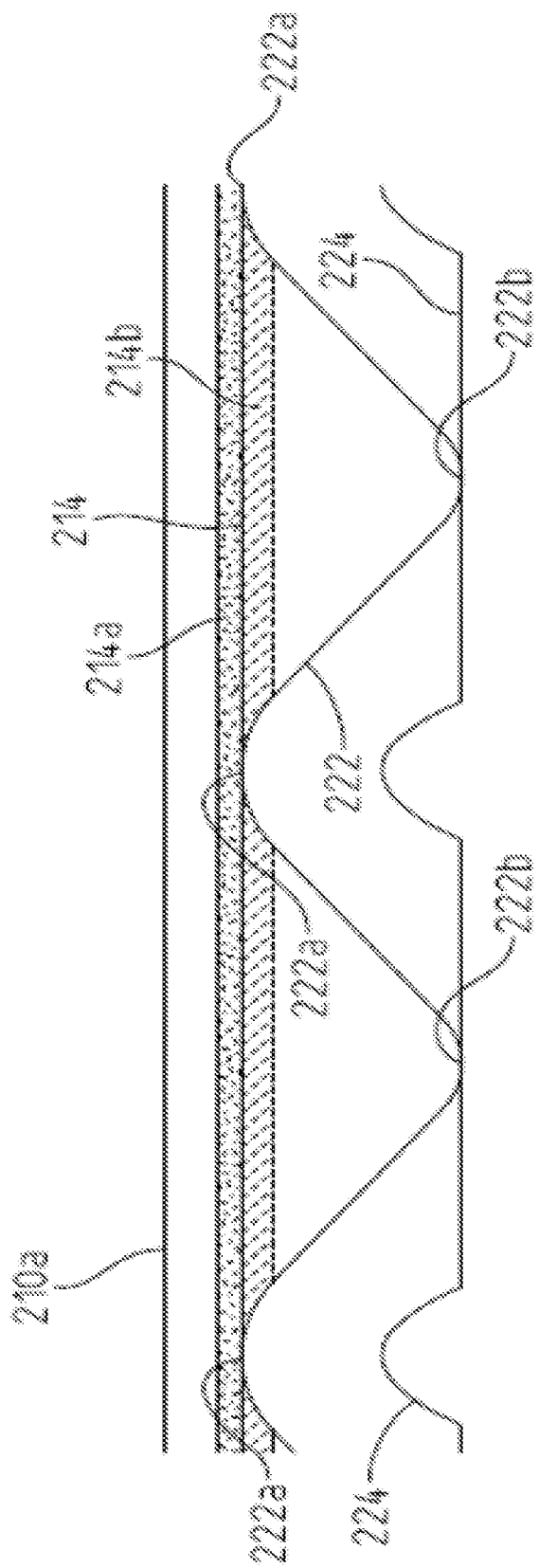
FIG. 6 shows a prior art methodology and the results of the methodology for operating a pumping element during subsequent pumping cycles when no fuel delivery is desired.

In other words, the residual fluid volume 214 includes a trapped/clearance volume (e.g., 214a shown in FIG. 6) and an excess fluid volume (e.g., 214b shown in FIG. 6). As will be explained in further detail below, the trapped/clearance volume 214a is the difference between the volume of the pumping chamber 52 and the plunger 54. At the left TDC 222a in FIG. 5, the fluid volume is 214. The fluid volume at this point 214 contains a mass of fluid that is in a pressurized and compressed state. As the geometric volume of the pumping chamber expands, the fluid volume expands at the same rate as the fluid is being depressurized. After the fluid volume has been depressurized, the expansion volume of the fluid is shown as volume 214b in FIG. 6. In FIG. 5, this same expansion volume is shown as 218 to the left of BDC 222b. This residual amount or volume of fluid 214 causes inefficiencies when each pumping event is followed by a subsequent pumping event (e.g., the pumping element 30 continuously pumps fluid to the high-pressure system 106).

However, when no pump output delivery event is required during the next pumping cycle, this excess residual fluid 214 causes one or more inefficiencies within the fuel system 10. For example, following the pump output delivery event shown in FIG. 5, the operational conditions of the fueling system 10 may be such that no pump output delivery is desired from the subsequent next potential pumping event for any and/or all of the pumping elements 30. In other words and as mentioned briefly above, the controller 20 may determine a suspension of fuel delivery events for a pumping element 30/the fuel pump 14 (e.g., the controller 20 may cause the pumping element 30 to not deliver liquid to the high-pressure system 106 based on one or more sensors, such as the pressure sensor 36).

Figure 7:
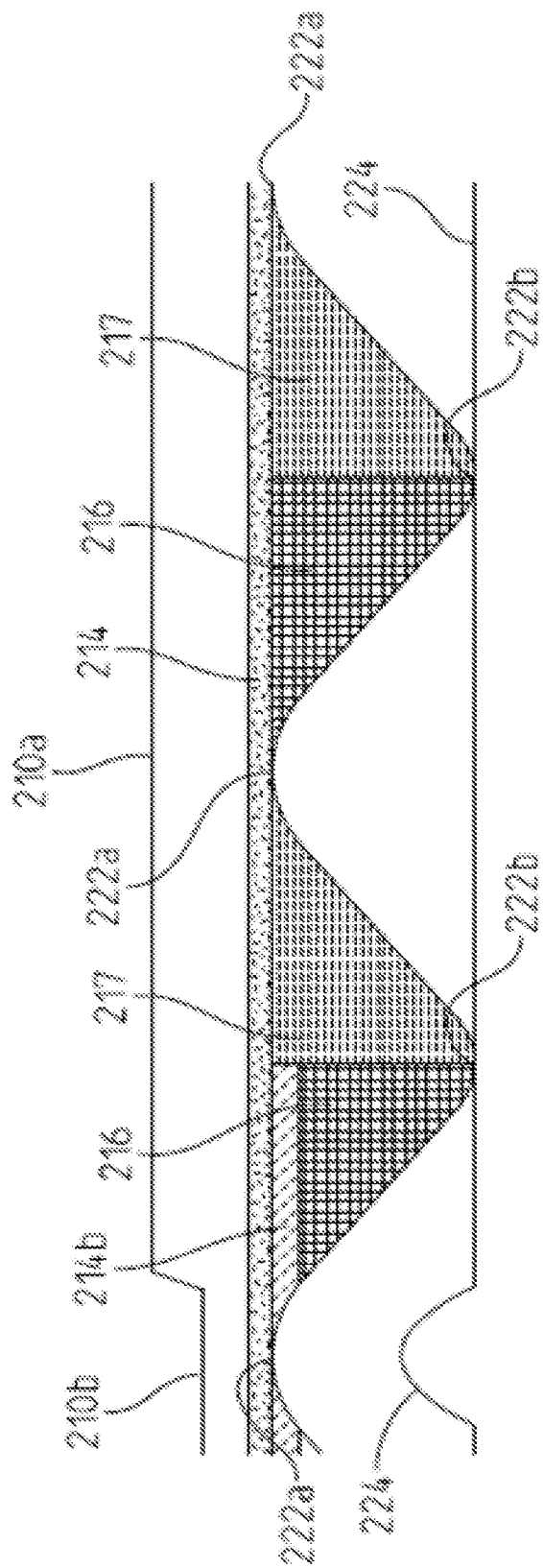
FIG. 7 shows another prior art methodology and the results of the methodology for operating a pumping element during subsequent pumping cycles when no fuel delivery is desired.

FIGS. 6 and 7 depict traditional, prior art methodologies for managing the residual fluid 214 when no pump output delivery is desired. For example, FIG. 6 depicts the operation of the pumping element 30 for subsequent potential pump events (e.g., cycles) when the inlet valve 44 remains in the closed position 210a such that additional fluid (e.g., the fluid from the filling stage 216 and the spilling stage 217 from FIG. 5) is prevented from entering the pumping chamber 52. In other words, at the start of subsequent cycles (e.g., at TDC 222a), the mass of the fluid in the pumping chamber 52 is contained in volume 214a due to the fluid being in a compressed and pressurized state. When in a decompressed state (e.g., after TDC 222a), the mass of the fluid in the pumping chamber 52 is represented by the sum of the volumes of 214a and 214b. The volume of the total fluid 214 is repeatedly compressed and decompressed as the plunger 54 travels to and from TDC 222a.

Each time a portion of the residual fluid 214 is compressed, some residual fluid 214 is leaked past the annular pump plunger 54 and barrel 50 clearance. For an efficient pumping element 30 that is designed to minimize this leakage rate, it may take many cycles for the residual fluid volume represented by 214b to be slowly leaked out of the pumping chamber 52 as it gradually leaks out of the annular clearance between the pumping plunger 54 and barrel 50 with subsequent repeated pressurizations of the pumping chamber 52. For the periods of time at which the residual fluid 214 in the pumping chamber is not being compressed, any leakage quantity past the inlet check valve 44 from the supply system (e.g., tank 102) to the pumping chamber 52 acts to extend the duration of this compression and decompression cycling of the residual fluid 214. Energy is lost each time the pressurized residual fluid 214 in the pumping chamber leaks out of the annular clearance. For each cycle and as the pumping chamber pressure 224 is increasing, drive torque is required for the pumping element 30. For each cycle as the pumping chamber pressure 224 is decreasing, the pumping element 30 acts to drive the fueling system 10 which connects to the high-pressure system 106. These torque reversals may have negative effects including audible noise emissions. For each cycle, even though no pumping output delivery takes place, the plunger 54 travels axially as the residual fluid 214 in the pumping chamber is repeatedly pressurized and depressurized (e.g., due to the plunger 54 being operatively coupled to the crankshaft 26).

However, using the control methodology of FIG. 6 may cause many inefficiencies and drawbacks. For example, audible noise may result due to pump drive torque reversals that are produced as a result of the compression and decompression of the excess trapped fluid 214b in the pumping chamber 52 each time the plunger 54 cycles through TDC 222a. Further, this methodology may cause a reduction in the durability of the fuel pump 14 as high pressure cycling of the pumping chamber 52 occurs even for events in which no fluid is delivered from the pump 14. Additionally, for pumps 14 that operate with a lubrication fluid (e.g., oil) which differs from the delivery fluid (e.g., fuel), oil to fuel and fuel to oil transfer occurs as a consequence of the pumping plunger's 54 axial displacement even for non-delivery potential pumping events in which the pumping plunger 54 is not forcibly retracted to follow the motion of the camshaft 56. Also, a reduction in efficiency is created due to the losses associated with high pressure leakage through the annular clearance and losses due to frictional loads between the plunger and barrel as the plunger travels axially. Furthermore, this methodology may cause an increased likelihood of undesired pumping to the high-pressure system 106 even after receiving instructions from the controller 20 to terminate pump output delivery for a singular or any combination of pumping elements 30.

FIG. 7 depicts another traditional, prior art methodology for managing the residual fluid 214 when no pump output delivery is desired. For example, if the operational conditions are such that no pump delivery is desired for one or more subsequent potential pumping events (e.g., pumping cycles), the controller 20 may open the inlet control valve 44 (e.g., from the closed position 210a to the open position 210b) for the pumping plunger 54 when the residual pressure 224 in the pumping chamber drops. This enables the valve 44 to open and then keep the inlet valve 44 open until the next desired pumping event is desired for the pumping element 30. For this prior art methodology, fluid from the low-pressure supply line acts to fill the pumping chamber 52 as its volume increases as the plunger 54 moves to BDC 222b (similar to FIG. 5 and shown by the filling stage 216 and initially 214b). After BDC 222b, the volume of fluid is spilled back from the pumping chamber to the inlet supply circuit 102 and/or 104 (e.g., similar to FIG. 5 and shown by spilling stage 217). This filling stage 216 and spilling stage 217 is repeated until the next desired pumping event from this pumping element 30. In other words, FIG. 7 shows the operation of the pumping element 30 for these subsequent potential pump events when the inlet valve 44 is opened and commanded to remain open (e.g., by the controller 20) following pumping chamber depressurization 224. The pumping chamber is then repeatedly filled and spilled as the camshaft 56 directs the plunger 54 to travel to and from TDC 222a.

However, using the control methodology of FIG. 7 also may cause many inefficiencies and drawbacks. For example, for pumps 14 that operate with a lubrication fluid (e.g., oil) which differs from the delivery fluid (e.g., fuel), oil to fuel and fuel to oil transfer occurs as a consequence of the pumping plunger's 54 axial displacement even for non-delivery potential pumping events in which the pumping plunger 54 is not forcibly retracted to follow the motion of the camshaft 56. Further, the repeated filling and spilling of the fluid results in the pressure variations in the inlet low-pressure supply system 102 and 104. This may negatively affect the robustness and durability of the low-pressure system 102, 104 and may also negatively interact with the filling and spilling operation of any other pumping elements (e.g., 30b) in the fueling system 10. Also, this control methodology may cause an increased likelihood of temporarily terminating pump output delivery upon command for a singular or any combination of pumping elements.

Figure 8:
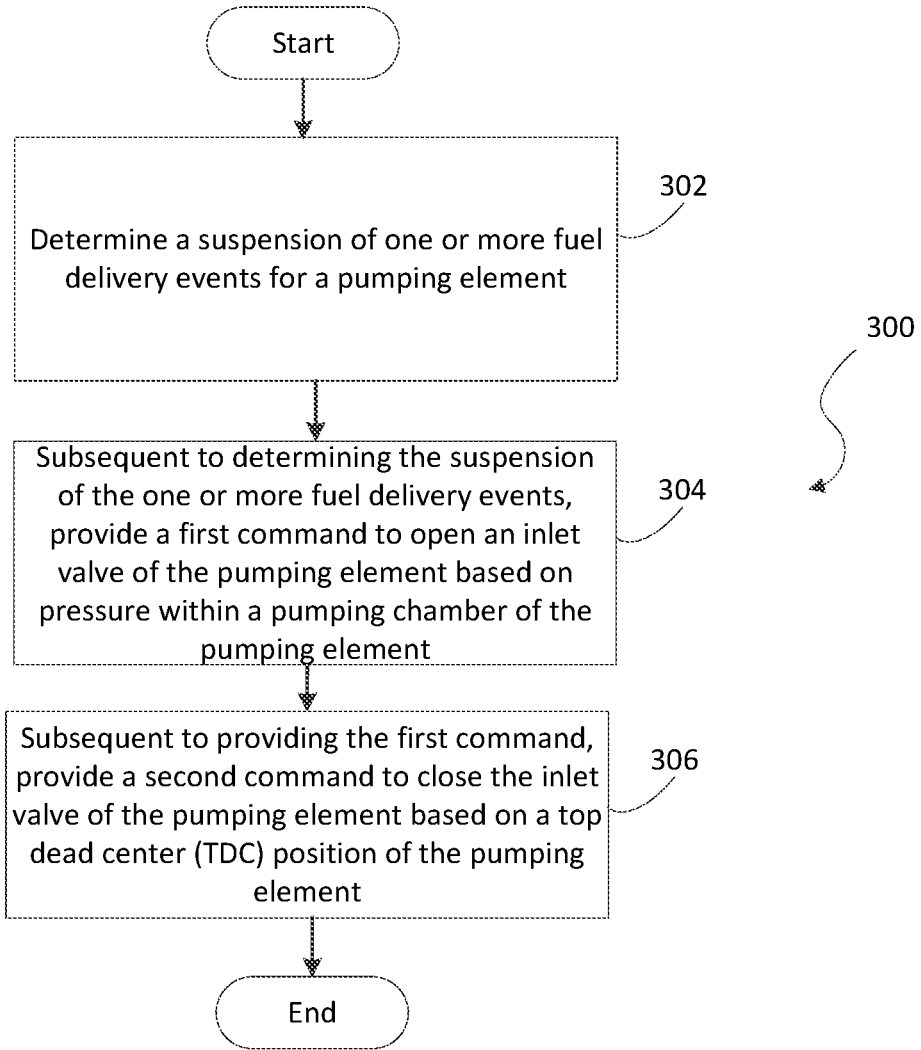
FIG. 8 shows an exemplary processing sequence for operating a pumping element during subsequent pumping cycles when no fuel delivery is desired.

FIG. 8 depicts a novel method 300 to address the above mentioned prior art deficiencies of FIGS. 6 and 7. In other words, the controller 20 may be configured to implement method 300 to manage the residual fluid 214 after determining no pump output delivery is desired. At step 302, the controller 20 determines to suspend one or more fuel delivery events for one or more pumping elements 30. In some examples, the controller 20 receives measurements from one or more sensors. For example, the pressure sensor 36 measures the pressure within the high-pressure system 106 such as the accumulator 16. The pressure sensor 36 provides the pressure measurements to the controller 20. Based on these received measurements, the controller 20 determines to suspend fuel delivery events for at least one pumping element 30.

At step 304 and subsequent to determining the suspension of the fuel delivery events, the controller 20 provides a first command to open an inlet valve 44 of the pumping element 30 to remove the excess residual fluid 214b within the pumping chamber 52 based on the pressure within a pumping chamber 52 of the pumping element 30. In other words, after detecting, estimating, calculating and/or otherwise determining that the pumping chamber 52 is about to, going to, and/or already began increasing pressure within the pumping chamber 52, the controller 20 provides the first command to open the inlet valve 44. In some examples, the time that the pressure will increase within the pumping chamber 52 is stored in memory, such as the memory 34. The controller 20 provides the first command based on retrieving this time stored in memory 34. In other examples, the controller 20 determines the increase in pressure within the pumping chamber 52 based on one or more measurements. For example, based on a pressure measurement (e.g., from the pressure sensor 36 and/or from a pressure sensor within the pumping element 30), the controller 20 determines the increase in pressure within the pumping chamber 52. Additionally, and/or alternatively, the controller 20 calculates and/or estimates that there will be an increase in pressure within the pumping chamber 52 based on one or more received measurements and/or stored information.

At step 306 and subsequent to providing the first command, the controller 20 provides a second command to close the inlet valve 44 of the fuel pump based on the TDC position 222a of the pumping element 30 (e.g., the plunger 54). In some examples, the time that the plunger 54 is at TDC 222a is stored in memory, such as memory 34. The controller 20 provides the second command based on retrieving this time stored in memory 34. In other examples, the controller 20 may receive information indicating a position of the plunger 54. For instance, the controller 20 may be in communication with a sensor that indicates the position of the crankshaft 26. Based on the position of the crankshaft 26, the controller 20 may calculate, estimate, and/or otherwise determine the position of the plunger 54. The controller 20 may provide the second command prior to the position of the plunger 54 being at the TDC position 222a. In other words, the controller 20 may provide the second command after the plunger 54 reaches the BDC position 222b and prior to the position of the plunger 54 reaching the TDC position 222a. In some variations, the controller 20 provides the second command substantially at the TDC position 222a and/or immediately after the TDC position 222a. FIGS. 9-13 will describe the steps of method 300 in further detail.

Figure 9:
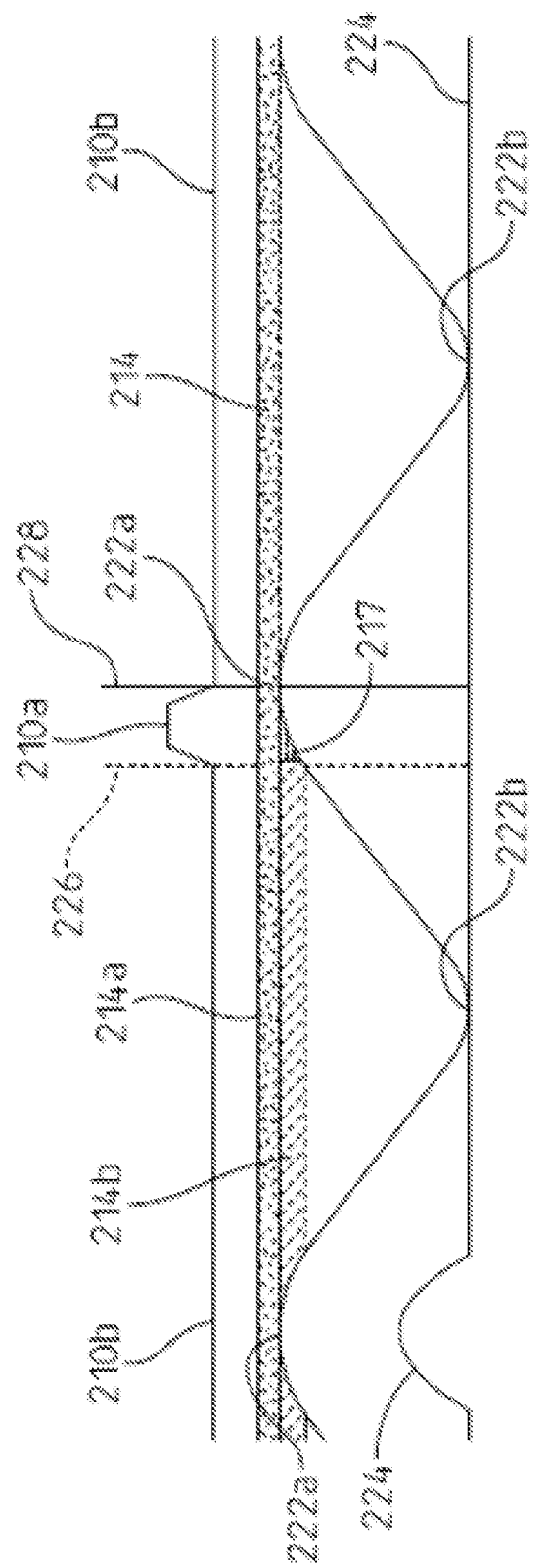
FIGS. 9-13 show novel methodologies and the results of the methodologies for operating a pumping element during subsequent pumping cycles when no fuel delivery is desired.

FIG. 9 depicts an example of using the novel method 300 to deal with the residual fluid 214 when no pump output delivery is desired. For example, based on the determination from step 302 (e.g., a pumping discharge quantity is not desired in the events following a pumping discharge events), the inlet control valve 44 is opened at a timing 226 that is substantially at the time when the residual fluid volume 214 in the pumping chamber is about to be compressed by the advancing camshaft 56. In other words, based on the controller 20 determining a timing 226 associated with an increase in pressure 224 within the pumping chamber 52, the controller 20 provides the first command to the inlet valve 44. The first command is configured to cause the inlet valve 44 to open. Due to the opening of the inlet valve 44 caused by the first command, the excess fluid 214b in the pumping chamber 52 is expelled (e.g., volume of fluid shown by 217) to the inlet supply circuit (e.g., the low-pressure pump 104 and/or tank 102) rather than compressed.

The inlet control valve 44 is then closed near the time 228 when the plunger 54 is at a proximate position to TDC 222a.

In other words, based on the camshaft 56 axially displacing the plunger 54 to a position substantially at the TDC 222*a*, the controller 20 provides the second command to close the inlet valve 44. The remaining uncompressed fluid volume 214 in the pumping chamber 52 is approximately equal to the trapped/clearance volume 214*a* of the pumping chamber since any excess fluid 214*b* has just been expelled from the pumping chamber 52. For subsequent potential pumping events, as long as the valves (e.g., inlet valve 44 and/or outlet valve 48) associated with the pumping chamber remain closed and do not have substantial leakage rates, there are substantially zero pumping chamber pressure 224 rises which results for subsequent potential pumping events.

Figure 10:
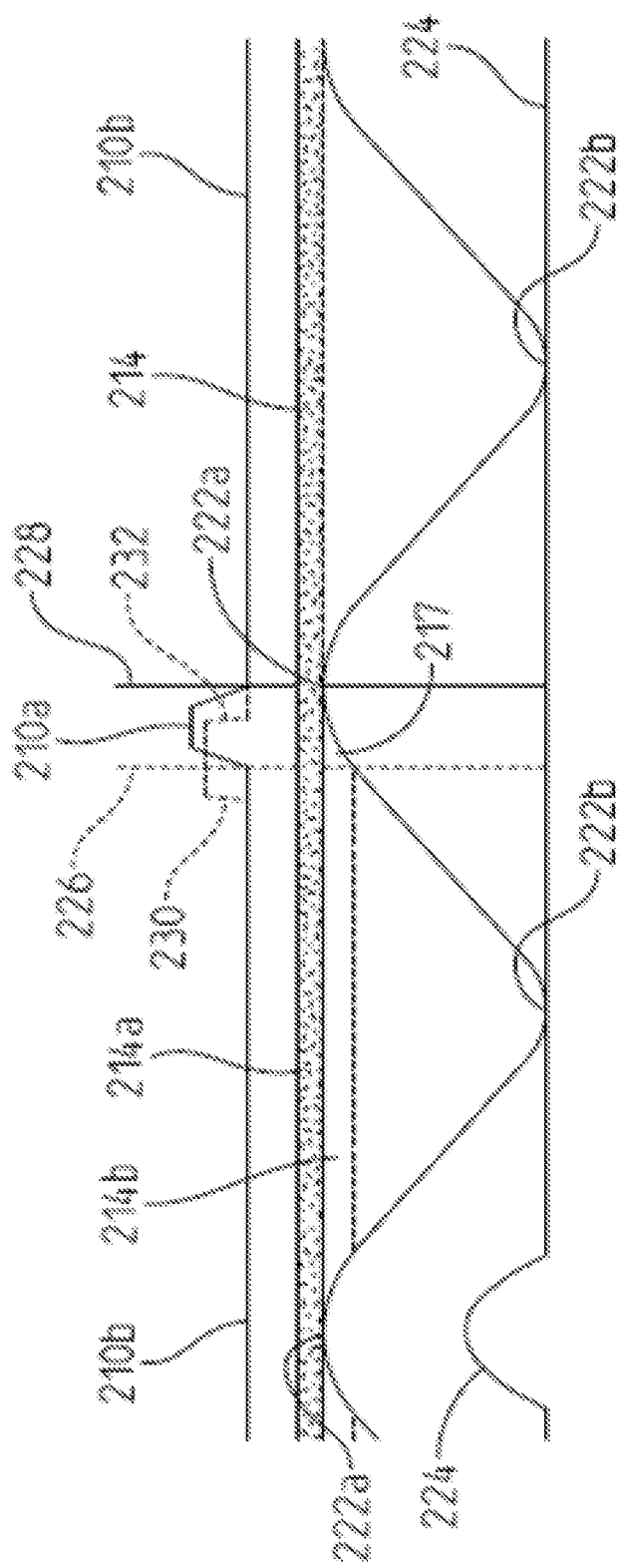

FIG. 10 depicts another example of using the novel method 300 to manage the residual fluid 214 when no pump output delivery is desired. The methodology depicted in FIG. 10 is similar to the methodology of FIG. 9; however, it also includes the inlet valve 44 opening 230 and closing commands 232 from the controller 20 to the inlet valve 44. In some examples, the first 230 and second 232 commands are two separate commands. The first command 230 is configured to open the inlet valve 44 and the second command 232 is configured to close the inlet valve 44. In other examples, the controller 20 provides a continuous command to the inlet valve 44 (e.g., in examples where the inlet valve 44 is normally open or normally closed). The first 230 and second commands 232 are either to begin providing a signal to the inlet valve 44 or cease providing a signal to the inlet valve 44. For example, for a normally closed inlet valve 44, and at step 304, the controller 20 provides a first command 230 or signal to open the inlet valve 44. At step 306, the controller 20 provides a second 232 command or ceases providing the signal to close the inlet valve 44. The first 230 and second 232 commands are switched for the normally open inlet valve 44. In other words and as described in additional detail below, the continuous command is based on an instance in time to open the inlet valve 44 (e.g., the first command 230) and a duration to keep the inlet valve 44 open (e.g., second command 232).

The timing of the valve opening command (e.g., the first command 230) from the controller 20 may be based on the response and sensitivity of the fueling system 10 to factors such as the inlet valve's 44 opening response time, the inlet valve stroke, the pumping element 30 and/or engine speed, the camshaft 56 profile, the pressure of the high pressure system 106, and the pump's trapped volume 214. In other words, the controller 20 determines a response time to provide the first command based on the time 226 indicating the increase in pressure within the pumping chamber 52 and/or based on at least one of the above factors. For example, for inlet valves 44 with a greater opening response time, the controller 20 may provide the first command 230 at a time that is substantially before the time 226 indicating the increase in pressure. For inlet valves 44 with a lower opening response time, the controller 20 may provide the first command 230 at a time that is nearer or closer to the time 226.

The timing of the valve closing command (e.g., the second command 232) from the controller 20 may include the response and sensitivity of the system to factors such as the inlet valve's 44 closing response time, the inlet valve 44 stroke, the pumping element 30 and engine speed, the cam profile, the pressure of the high pressure system 106, and the pump's trapped volume 214. In other words, the controller 20 determines a response time to provide the second command based on the time 228 indicating the TDC 222*a* position of the plunger 54 and/or based on at least one of the above factors.

The controller 20 may determine the opening 230 and/or closing command 232 timings using values in a non-changing control structure such as with a look-up table, equations, or similar methods. In addition, the controller 20 may determine the opening 230 and/or closing command timings based on feedback commands such as but not limited to the pressure change in the high-pressure system 106 (e.g., measured by the pressure sensor 36) across the trapped volume spilling event.

Figure 11:
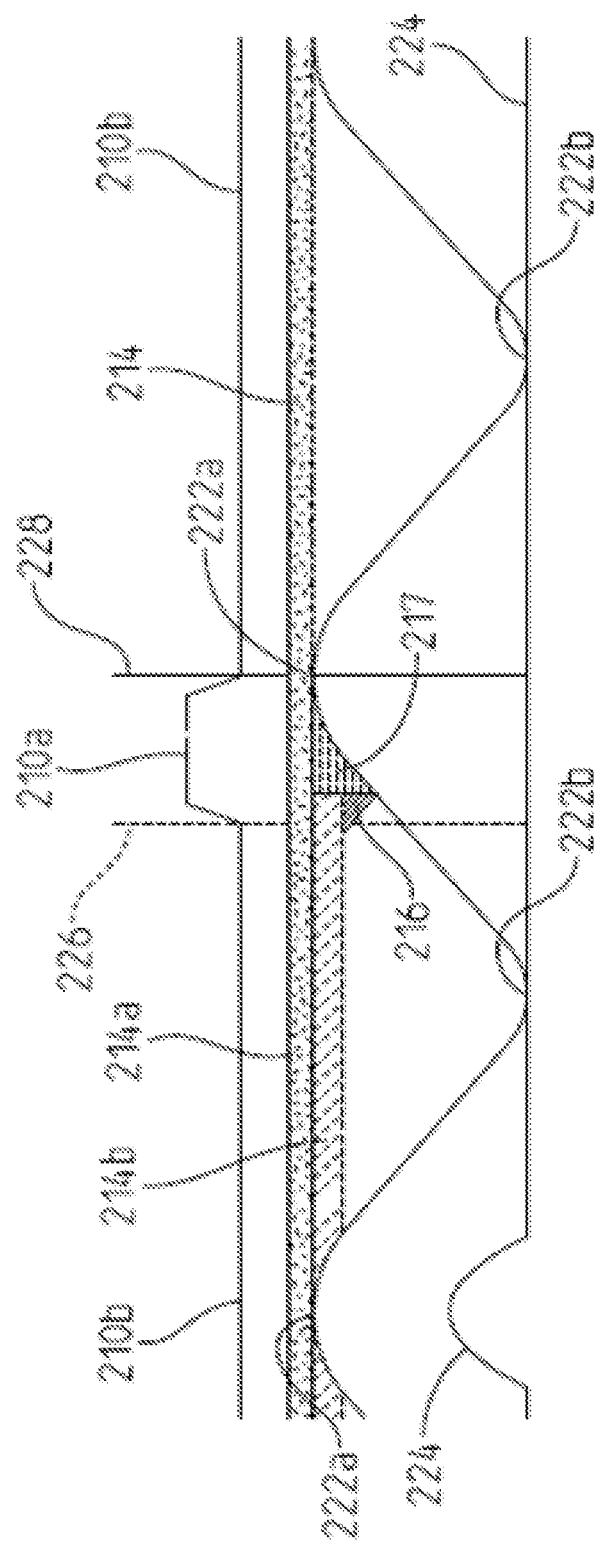

FIG. 11 depicts yet another example of using the novel method 300 to manage the residual fluid 214 when no pump output delivery is desired. For example, the controller 20 is configured to provide the first command to open the inlet valve 44 a pre-determined opening time before the increase in pressure in the pumping chamber 52 (e.g., the first command is slightly advanced relative to the timing shown in FIG. 9). The pre-determined opening time may be stored in memory 34 and may be fuel system 10 specific and/or pumping element 30 specific. As shown, the inlet control valve 44 is opened at a timing 226 slightly before the time when the residual fluid volume 214*b* in the pumping chamber is about to be compressed by the advancing camshaft 56. Since the inlet valve 44 is opened slightly earlier, a relatively small quantity of fluid 216 from the low-pressure system 102 and/or 104 enters the pumping chamber 52. After the reduced size pumping chamber volume 216 is filled, spilling stage 217 initiates similar to the manner described above. The excess fluid 214*b* in the pumping chamber 52 is expelled to the inlet supply circuit 102 and/or 104 rather than being compressed since the inlet control valve 44 is open. The inlet control valve 44 is then closed 210*b* near the time 228 when the pump cam is at TDC 222*a*. The remaining residual fluid volume 214 in the pumping chamber is approximately equal to the trapped/clearance volume 214*a* of the pumping chamber 52 since any excess fluid 214*b* has just been expelled from the pumping chamber 52. For subsequent potential pumping events, as long as the valves 44 and/or 48 associated with the pumping chamber 52 remain closed and do not have substantial leakage rates, there are no pumping chamber pressure 224 rises that result for subsequent potential pumping events.

In some examples, the methodologies from FIGS. 10 and 11 are combined. For example, the controller 20 determines a response time based on the time indicating the increase in pressure within the pumping chamber 52 and/or based on at least one of the above factors (e.g., the inlet valve's 44 opening response time, the inlet valve stroke, the pumping element 30 and/or engine speed, the camshaft 56 profile, the pressure of the high pressure system 106, and the pump's trapped volume 214). The controller 20 provides the first command based on the response time associated with the above factors and the pre-determined opening time (e.g., the response time and the pre-determined opening time are added together and used as a time offset to the time indicating the increase in pressure).

Figure 12:
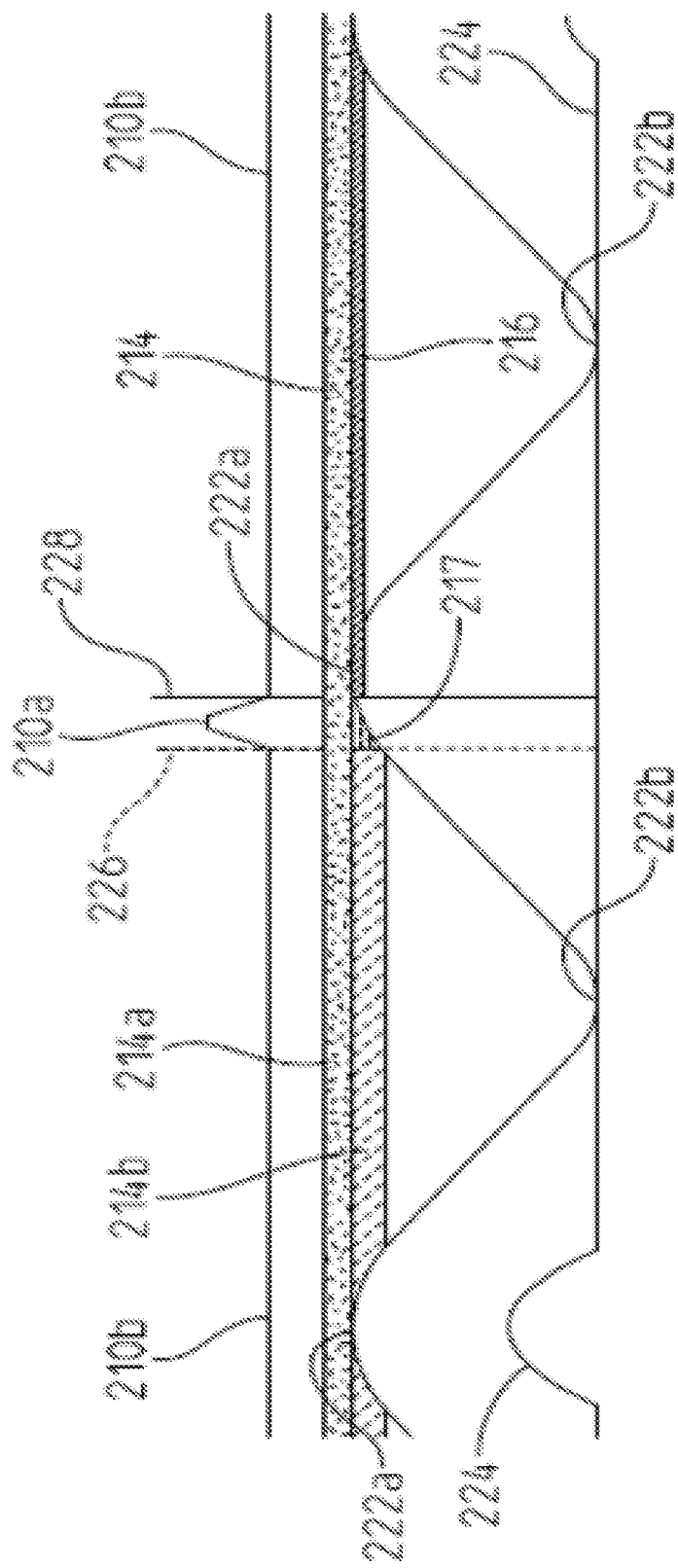

FIG. 12 depicts yet another example of using the novel method 300 to manage the residual fluid 214 when no pump output delivery is desired. For example, the controller 20 is configured to provide the second command to close the inlet valve 44 a pre-determined closing time before the plunger 54 reaches the TDC position 222*a*. (e.g., the controller 20 provides the second command slightly advanced relative to the optimal timing shown in FIG. 9). The pre-determined closing time may be stored in memory 34 and may be fuel system 10 specific and/or pumping element 30 specific. As shown, the inlet control valve 44 is closed at a timing 228 slightly before pump TDC 222a. Since the inlet valve 44 is closed slightly earlier than optimal, not all of the excess fuel 214b in the pumping chamber is expelled. However, this small quantity of fuel is significantly less than the prior art methods described above.

In some examples, the methodologies from FIGS. 10, 11 and/or 12 are combined. For example, the controller 20 determines a response time based on the time indicating the increase in pressure within the pumping chamber 52 and/or based on at least one of the above factors (e.g., the inlet valve's 44 closing response time, the inlet valve 44 stroke, the pumping element 30 and engine speed, the camshaft 56 profile, the pressure of the high pressure system 106, and the pump's trapped volume 214). The controller 20 provides the second command based on the response time associated with the above factors and the pre-determined closing time (e.g., the response time and the pre-determined closing time are added together and used as a time offset to the time indicating the plunger 54 at TDC 222a).

Figure 13:
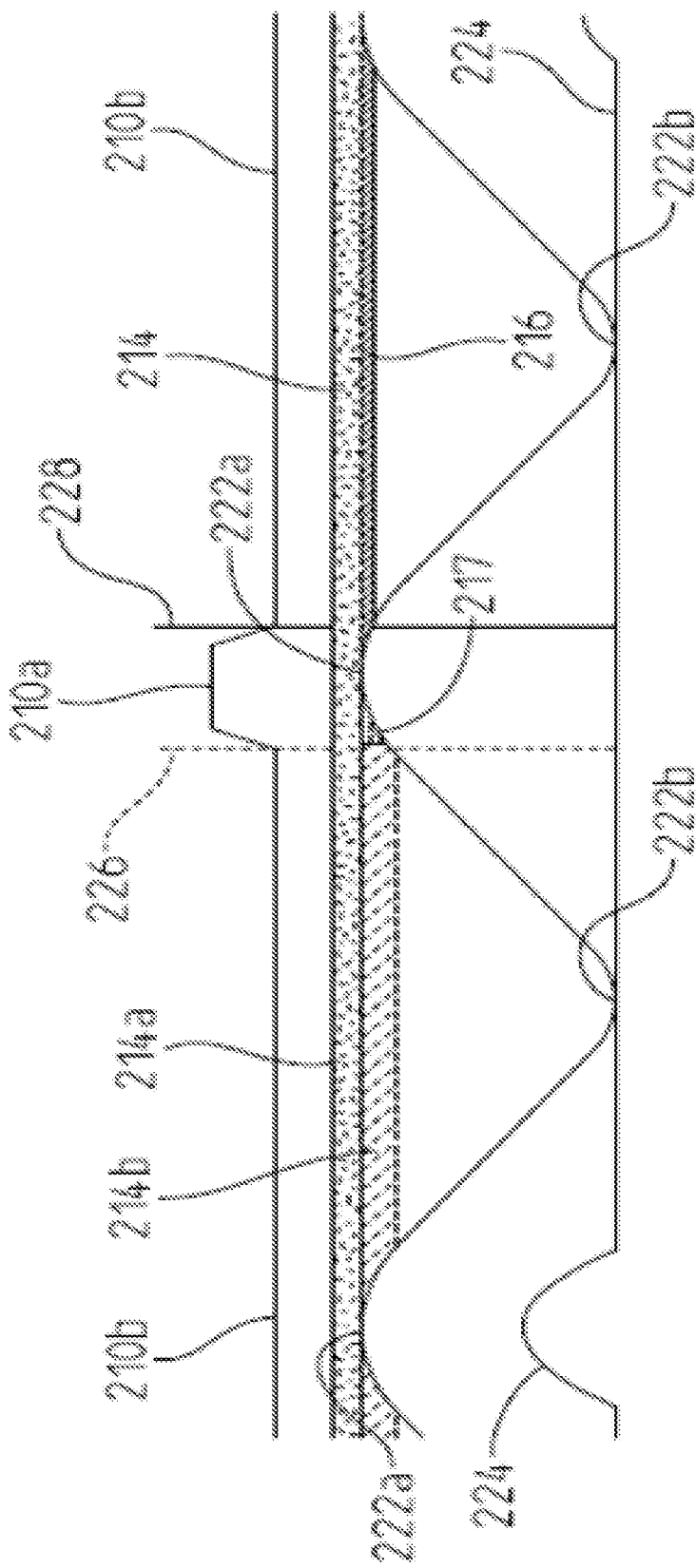

FIG. 13 depicts yet another example of using the novel method 300 to manage the residual fluid 214 when no pump output delivery is desired. For example, the controller 20 is configured to provide the second command to close the inlet valve 44 a pre-determined closing time after the plunger 54 reaches the TDC position 222a. (e.g., the controller 20 provides the second command slightly retarded relative to the optimal timing shown in FIG. 9). The pre-determined closing time may be stored in memory 34 and may be fuel system 10 specific and/or pumping element 30 specific. As shown, the inlet control valve 44 is closed at a timing 228 slightly after pump TDC 222a. During this time difference between pump TDC 222a and the inlet valve's 44 fully closed timing, a small quantity of fuel 216 acts to partially fill the pumping chamber 52. This small quantity of fuel is significantly less than with the prior art methods described above.

In some examples, the methodologies from FIGS. 10, 11, and/or 13 are combined. For example, the controller 20 determines a response time based on the time indicating the increase in pressure within the pumping chamber 52 and/or based on at least one of the above factors (e.g., the inlet valve's 44 closing response time, the inlet valve 44 stroke, the pumping element 30 and engine speed, the cam profile, the pressure of the high pressure system 106, and the pump's trapped volume 214). The controller 20 provides the second command based on the response time associated with the above factors and the pre-determined closing time (e.g., the response time and the pre-determined closing time are added together and used as a time offset to the time indicating the plunger 54 at TDC 222a).

Fuel pumps 14 are necessarily sized such that they can deliver the maximum quantity at the associated system operating conditions. However, for most applications, for a majority of the operating time, the required pump delivery is much less than this maximum quantity. For example, for fuel systems 10 in which there are multiple pumping elements (e.g., 30a and 30b shown in FIG. 4), for many applications the output delivery of one or more of the individual pumping elements can be temporarily discontinued and the pump 14 can deliver the demanded output quantity on the remaining pumping elements.

Figure 14:
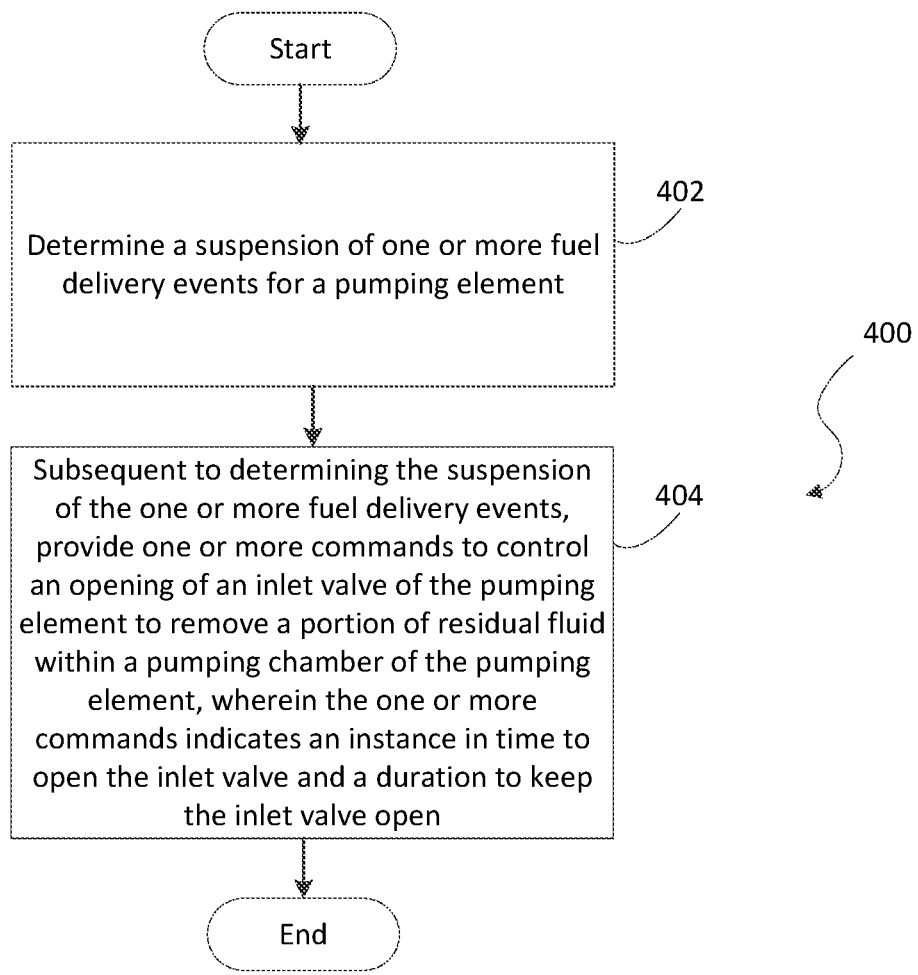
FIG. 14 shows another exemplary processing sequence for operating a pumping element during subsequent pumping cycles when no fuel delivery is desired.

FIG. 14 depicts another novel method 400 to address the above mentioned prior art deficiencies of FIGS. 6 and 7. In other words, the controller 20 may be configured to implement method 400 to manage the residual fluid 214 and the excess residual fluid 214b after determining no pump output delivery is desired. Similar to step 302, at step 402, the controller 20 determines to suspend one or more fuel delivery events for one or more pumping elements 30.

At step 404 and subsequent to determining the suspension of the fuel delivery events, the controller 20 provides one or more commands to control an opening of an inlet valve 44 of the pumping element 30 to remove a portion of the residual fluid 214 within a pumping chamber 52 of the pumping element 30. The one or more commands indicates an instance in time to open the inlet valve 44 and a duration to keep the inlet valve 44 open. For example, instead of providing a first command to open the inlet valve 44 and a second command to close the inlet valve 44, the controller 20 may provide one or more commands that indicate an instance in time to open the inlet valve 44 and a duration to keep the inlet valve 44 open.

The controller 20 may determine the instance in time to open the inlet valve 44 similar to step 304 of FIG. 8 and the additional examples described in FIGS. 9-13. In other words, the controller 20 may determine the instance in time to open the inlet valve 44 based on the pressure within the pumping chamber 52. Additionally, and/or alternatively, the controller 20 may determine the instance in time to open the inlet valve 44 based on the inlet valve's 44 opening response time, the inlet valve stroke, the pumping element 30 and/or engine speed, the camshaft 56 profile, the pressure of the high pressure system 106, the pump's trapped volume 214, and/or a pre-determined opening time.

The controller 20 may determine the duration to keep the inlet valve 44 open similar to step 306 of FIG. 8 and the additional examples described in FIGS. 9-13. In other words, the controller 20 may determine the duration to keep the inlet valve 44 open based on the TDC position 222a of the pumping element 30. Additionally, and/or alternatively, the controller 20 may determine the duration to keep the inlet valve 44 open based on the inlet valve's 44 closing response time, the inlet valve stroke, the pumping element 30 and/or engine speed, the camshaft 56 profile, the pressure of the high pressure system 106, the pump's trapped volume 214, and/or a pre-determined closing time.

Advantages of using the above novel method 300 and/or the system 10 described above include: an increase in efficiency by reducing the losses associated with high pressure leakage through the annular clearance, losses due to frictional loads between the plunger 54 and barrel 50 as the plunger 54 travels axially, and losses due to flow into and out of the pumping chamber 52 through the inlet valve 44; a reduction in audible noise as a result of the elimination of pump drive torque reversals which are produced as a result of the compression and decompression of the excess trapped fluid 214 in pumping chamber 52 each time the camshaft 56 cycles the plunger 54 through TDC 222a; an increase in the durability of the pump 14 as the number of high pressure cycles of the pumping chamber 52 is reduced over the life of the pump 14; a reduction in the oil to fuel and fuel to oil transfer rates of the pump for non-delivery potential pumping events as a result of the reduction in the pressure cycling frequency and magnitude and a reduction in the pumping plunger 54 stroke for pump configurations in which the pumping plunger 54 is not forcibly retracted to follow the motion of the camshaft 56; a reduction the pressure variations in the inlet low pressure supply system (e.g., 102 and/or 104) relative to the prior art methods described above; and a reduced likelihood of temporarily terminating pump output delivery upon command for a singular or any combination of pumping elements 30a and/or 30b.

It should be understood that, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

I claim:

1. A method of controlling a pump having at least one pumping element comprising:
   determining, by a controller, a suspension of one or more fuel delivery events for a pumping element of the at least one pumping element;
   subsequent to determining the suspension of the one or more fuel delivery events, providing, by the controller, a first command to open an inlet valve of the pumping element to remove a portion of residual fluid within a pumping chamber based on pressure within the pumping chamber of the pumping element; and
   subsequent to providing the first command, providing, by the controller, a second command to close the inlet valve of the pumping element based on a top dead center (TDC) position of the pumping element.

2. The method of claim 1, further comprising:
   determining a first instance in time corresponding to the pressure within the pumping chamber, and
   wherein the providing the first command is based on the first instance in time.

3. The method of claim 2, further comprising:
   determining a response time based on at least one of: the inlet valve's opening response time, a stroke of the inlet valve, a speed of the pumping element, an engine speed, a profile of a camshaft, a pressure of a high-pressure system, and an amount of residual fluid within the pumping chamber, and
   wherein the determining the first instance in time is based on the response time.

4. The method of claim 2, further comprising:
   determining a pre-determined opening time corresponding to a time period prior to an increase in pressure within the pumping chamber, and
   wherein the determining the first instance in time is based on the pre-determined opening time.

5. The method of claim 1, further comprising:
   determining a second instance in time corresponding to the TDC position of the pumping element, and
   wherein the providing the second command is based on the second instance in time.

6. The method of claim 5, further comprising:
   determining a response time based on at least one of: the inlet valve's closing response time, a stroke of the inlet valve, a speed of the pumping element, an engine speed, a profile of a camshaft, a pressure of a high-pressure system, and an amount of residual fluid within the pumping chamber, and
   wherein the determining the second instance in time is based on the response time.

7. The method of claim 5, further comprising:
   determining a pre-determined closing time corresponding to a time period prior to the pumping element reaching the TDC position, and
   wherein the determining the second instance in time is based on the pre-determined closing time.

8. The method of claim 5, further comprising:
   determining a pre-determined closing time corresponding to a time period subsequent to the pumping element reaching the TDC position, and
   wherein the determining the second instance in time is based on the pre-determined closing time.

9. The method of claim 1, wherein the determining the suspension of one or more fuel delivery events is based on a pressure measurement indicating a pressure within a fuel accumulator.

10. A method of controlling a pump having at least one pumping element comprising:
    determining, by a controller, a suspension of one or more fuel delivery events for a pumping element of the at least one pumping element; and
    subsequent to determining the suspension of the one or more fuel delivery events, providing, by the controller, one or more commands to control an opening of an inlet valve of the pumping element to remove a portion of residual fluid within a pumping chamber of the pumping element, wherein the one or more commands indicates an instance in time to open the inlet valve and a duration to keep the inlet valve open.

11. The method of claim 10, further comprising:
determining the instance in time based on an increase in pressure within the pumping chamber.

12. The method of claim 11, further comprising:
determining a response time based on at least one of: the inlet valve's opening response time, a stroke of the inlet valve, a speed of the pumping element, an engine speed, a profile of a camshaft, a pressure of a high-pressure system, and an amount of residual fluid within the pumping chamber, and
wherein the determining the instance in time is based on the response time.

13. The method of claim 11, further comprising:
determining a pre-determined opening time corresponding to a time period prior to the increase in pressure within the pumping chamber, and
wherein the determining the instance in time is based on the pre-determined opening time.

14. The method of claim 10, further comprising:
determining the duration to keep the inlet valve open is based on a top dead center (TDC) position of the pumping element.

15. The method of claim 14, further comprising:
determining a response time based on at least one of: the inlet valve's closing response time, a stroke of the inlet valve, a speed of the pumping element, an engine speed, a profile of a camshaft, a pressure of a high-pressure system, and an amount of residual fluid within the pumping chamber, and
wherein the determining the duration to keep the inlet valve open is based on the response time.

16. The method of claim 14, further comprising:
determining a pre-determined closing time corresponding to a time period prior to the pumping element reaching the TDC position, and
wherein the determining the duration to keep the inlet valve open is based on the pre-determined closing time.

17. The method of claim 14, further comprising:
determining a pre-determined closing time corresponding to a time period subsequent to the pumping element reaching the TDC position, and
wherein the determining the duration to keep the inlet valve open is based on the pre-determined closing time.

18. The method of claim 10, wherein the determining the suspension of one or more fuel delivery events is based on a pressure measurement indicating a pressure within a fuel accumulator.

19. A controller comprising:
one or more processors; and
memory storing instructions that when executed by the one or more processors, cause the one or more processors to:
determine a suspension of one or more fuel delivery events for a pumping element;
subsequent to determining the suspension of the one or more fuel delivery events, provide a first command to open an inlet valve of the pumping element to remove a portion of residual fluid within a pumping chamber based on pressure within the pumping chamber of the pumping element; and
provide a second command to close the inlet valve of the pumping element based on a top dead center (TDC) position of the pumping element.

20. The controller of claim 19, wherein the first command indicates an instance in time to open the inlet valve, and wherein the second command indicates a duration to keep the inlet valve open.

* * * * *